United States Patent [19]

Bukhshtab et al.

[11] Patent Number: 5,226,102
[45] Date of Patent: Jul. 6, 1993

[54] LIGHT-REFLECTION METHOD FOR TRANSMISSION-LOSS MEASUREMENTS IN OPTICAL FIBER LIGHTGUIDES

[75] Inventors: Mikhail A. Bukhshtab; Vladislav N. Koromyslichenko, both of Leningrad, U.S.S.R.

[73] Assignee: Leningradskoe Otdelenie Tsentralnogo Nauchnoissledovatelskogo Instituta Svjazi, Leningrad, U.S.S.R.

[21] Appl. No.: 472,375

[22] Filed: Feb. 1, 1990

[30] Foreign Application Priority Data

Feb. 1, 1989 [SU] U.S.S.R. .................. 4688091
Feb. 1, 1989 [SU] U.S.S.R. .................. 4688093

[51] Int. Cl.$^5$ .................. G02B 6/38; G01N 21/00
[52] U.S. Cl. .................. 385/98; 385/97; 356/73.1
[58] Field of Search .............. 350/96.20, 96.21, 96.22; 356/73.1; 385/95, 96, 97, 98, 99, 38, 147

[56] References Cited

U.S. PATENT DOCUMENTS

| | | | |
|---|---|---|---|
| 4,183,666 | 1/1980 | Tahara et al. | 356/73.1 |
| 4,286,979 | 9/1981 | Buckler et al. | 356/73.1 X |
| 4,391,517 | 7/1983 | Zucker et al. | 356/73.1 |
| 4,629,316 | 12/1986 | Shen et al. | 356/73.1 |
| 4,708,476 | 11/1987 | So et al. | 356/73.1 |
| 4,838,690 | 6/1989 | Buckland et al. | 356/73.1 |
| 4,945,776 | 8/1990 | Yamada et al. | 356/73.1 X |
| 4,971,418 | 11/1990 | Dorsey et al. | 350/96.21 |

Primary Examiner—Brian Healy
Attorney, Agent, or Firm—Fleit, Jacobson, Cohn, Price, Holman & Stern

[57] ABSTRACT

Object—to increase versatility by way of providing for the possibility of measuring losses in any of the i-th light-guides out of an arbitrary number of lightguides spliced so as to accommodate minimal air gaps, and at the joint between the (i−1)th and ith lightguides spliced without an air gap (ith joint), which is ensured by making successive measurements of the energy of reflected pulses from the energy and total power of the components of a radiation pulse from the end faces of the last and intermediate lightguides and their spliced end faces, and measuring optical losses from methematical formulas.

2 Claims, 2 Drawing Sheets

LIGHT-REFLECTION METHOD FOR TRANSMISSION-LOSS MEASUREMENTS IN OPTICAL FIBER LIGHTGUIDES

FIELD OF INVENTION

The present invention relates to the fiber optics engineering, being capable of being used in determining attenuation factors in communications lines built on the basis of optical fiber lightguides.

INDUSTRIAL APPLICATION

The present invention can be employed in the course of construction, repair and preventive maintenance of the fiber optics communications lines.

BACKGROUND OF THE INVENTION

Known in the art is a light-reflection method for measuring transmission losses in optical fiber lightguides (U.S.S.R. Application No. 4,204,727, favorable Official Action as of May 30, 1988), comprising the steps of coupling a sounding radiation pulse into the lightguide under investigation, through an idle lightguide, whose length is half of that of the steady-state mode distribution for a given type of lightguide, measuring the energy, $N_1$, of the pulse reflected from the output end face of the idle lightguide, measuring the energy, $N_2$, of the pulse reflected from the output end face of the idle lightguide and the input end face of the lightguide under investigation, which end faces are spaced at a minimal distance from one another, measuring the energy, $N_3$, of the pulse reflected from the output end face of the lightguide under investigation, determining transmission losses, $\mu$, per unit length of the lightguide under investigation. This method is viewed here as the prior art most closely related to the present invention in terms of its engineering essence.

A disadvantage of the known method of measuring losses lies in that it is impossible to make measurements at lightguide joints be that for two lightguides spliced without an air gap, or an arbitrary number of lightguides spliced with one another so as to accomodate minimal air gaps, or at those points where these lightguides are connected without an air gap.

It is a first object of the present invention to increase versatility by way of providing for the possibility of determining losses in any of the ith lightguides out of an arbitrary number of lightguides spliced with minimal air gaps.

It is a second object of the present invention to further increase versatility by way of determining optical transmission losses at the point of connection between an idle lightguide and the one under investigation, and consequently at the place of connection between any (i−1)th and ith lightguides spliced without an air gap.

DEFINITIONS

The first object in view is achieved through that the known light-reflection method for transmission-loss measurements in optical fiber lightguides comprising the steps of coupling a sounding light pulse into a first lightguide, measuring the energy, $N_1$, of the pulse reflected from the output end face of the first lightguide, splicing the first and second lightguides so as to accommodate a minimal air gap, further comprising the steps of measuring the energy, $N_2$, of the pulse reflected from the air gap located between the output end face of the first lightguide and the input end face of the second lightguide, measuring the energy, $N_3$, of the pulse reflected from the output end face of the second lightguide, determining optical transmission losses in the second lightguide from the equation $$2\mu l = 2ln(N_2 - N_4) - ln\, N_4 - ln\, N_3 \quad (1)$$

where,
$l_2$ = length of the second lightguide, is made to comprise, according to the present invention, the following steps:

measure the signal $N_1$ proceeding from the energy and total power of the components of the radiation pulse reflected from the output end face of the (i−1)th lightguide, measure the signal $N_2$ proceeding, respectively, from the energy or total power of the components of the pulse reflected from the end faces of the (i−1)th and i-th lightguides spliced so as to accommodate a minimal air gap, measure the signal $N_3$ proceeding from the energy or total power of the components of the pulse reflected from the output end face of the i-th lightguide, after having determined optical transmission losses, $\mu$, from Equation (1), throughout the entire i-th lightguide, $l_i$ in length, connecting the (i−1)th and i-th lightguide without an air gap, measuring the energy or total power $N_4$ of the components of the pulse reflected from the output end face of the thus formed integral light-guide, determining the optical transmission losses, $K_i$, in the ith joint, from the equation $$K_i = 10lg\frac{1}{\tau_i} = (-4.34\mu_i l_i)(5lgN_4 - 5lgN_4) = \quad (2)$$
$$= 10lgN_1 - 10lg(N_2 - N_1) + 5lgN_3 - 5\,lgN_4$$

where, $\tau_i$ = transmission factor for the i-th joint.

In order to achieve the second object of the invention, it is suggested that upon having determined the optical transmission losses, $\mu$, in the lightguide under investigation, l in length, spliced are the idle lightguide and the one under investigation, without an air gap, measuring the energy or total power $N_4$ of the pulse reflected from the output end face of the thus formed integral lightguide, determining optical losses, K, at the joint from the equation $$K = 10lg\frac{1}{\tau} = (-4.343\mu l X 5lgN_4 - 5lgN_4) = \quad (3)$$
$$= 10lgN_4 - 10lg(N_2 - N_1) + 5lgN_3 - 5lgN_4$$

The above features of the present invention taken in their totality have never before been utilized, and were unknown, thus enabling one to consider the present invention as being consistent with the criterion of the world novelty.

The method for determining losses within any of the i-th lightguides out of an arbitrary number of lightguides spliced so as to accommodate minimal air gaps, and losses at the points of joints without an air gap of the (i−1)th and i-th lightguides (ith joint), comprises the following sequence of interrelated steps:

1. Measure the energy or total power $N_1$ of the components of the pulse that has passed in the forward and backward directions through the spliced lightguides, (i−1) in number, and reflected from the output end face of the (i−1)th lightguide;

2. Connect the (i−1)th and i-th lightguides so as to accommodate a minimal air gap measuring, respectively, the total energy or total power $N_2$ of the components of the pulse reflected from the air gap between these lightguides;

3. Measure the energy or respectively the total power $N_3$ of the pulse reflected from the output end face of the i-th light-guide;

4. Determine the total optical transmission losses within the lightguide, proceeding from the equation $$2\ \mu_i l_i = 2ln(N_2-N_4) - ln\ N_4 - ln\ N_3 \quad (4)$$

5. Connect the (i−1)th and i-th lightguides without an air gap;

6. Measure, respectively, the energy or total power $N_4$ of the components of the pulse reflected from the output end face of the thus formed integral lightguide.

7. Determine the losses within the ith joint from Equation (2).

An advantage of this method resides in that it provides for the possibility of measuring optical transmission losses in any of the i-th lightguides spliced with one another, wherein the number of the lightguides is an arbitrary figure, as well as at the joint between the (i−1)th and ith lightguides connected without an air gap. Because of the fact that by orders of magnitude more radiation is reflected from an end face of a high quality lightguide showing low light losses, than is scattered, the dynamic range of measurements is substantially increased towards the higher losses, and hence longer sections of the fiber optics communications lines. Given that, measurements of losses in lightguide joints without an air gap are being made in that same stable mode distribution, which is employed for testing the entire lightguide line.

The method of measuring optical transmission losses at a joint of lightguides without an air gap, comprises the following sequence of interrelated steps:

1. Having measured losses $\mu$ within the lightguide under investigation, l in length, connect the spliced idle lightguide and the one under investigation without an air gap;

2. Measure the energy or total power $N_4$ of the pulse reflected from the output end face of the thus formed integral lightguide;

3. Determine optical transmission losses, K, at the joint from Equation (3).

An advantage of this method lies in that along with the measurement of transmission losses within the lightguide under investigation, one can measure quantitatively the losses at the joint having no air gap between the idle, hence any arbitrary lightguide, and the lightguide under investigation, making these measurements at the same conditions of light propagation, corresponding to the stable mode distribution provided by the idle lightguide.

General feature—due to making measurements in reflected light with double sounding of the joint area, one can double the sensitivity to optical transmission losses in a joint as compared with the measurements made in the passing light.

BRIEF DESCRIPTION OF THE DRAWING

The present invention is further explained in the accompanying drawings.

Figure 1:
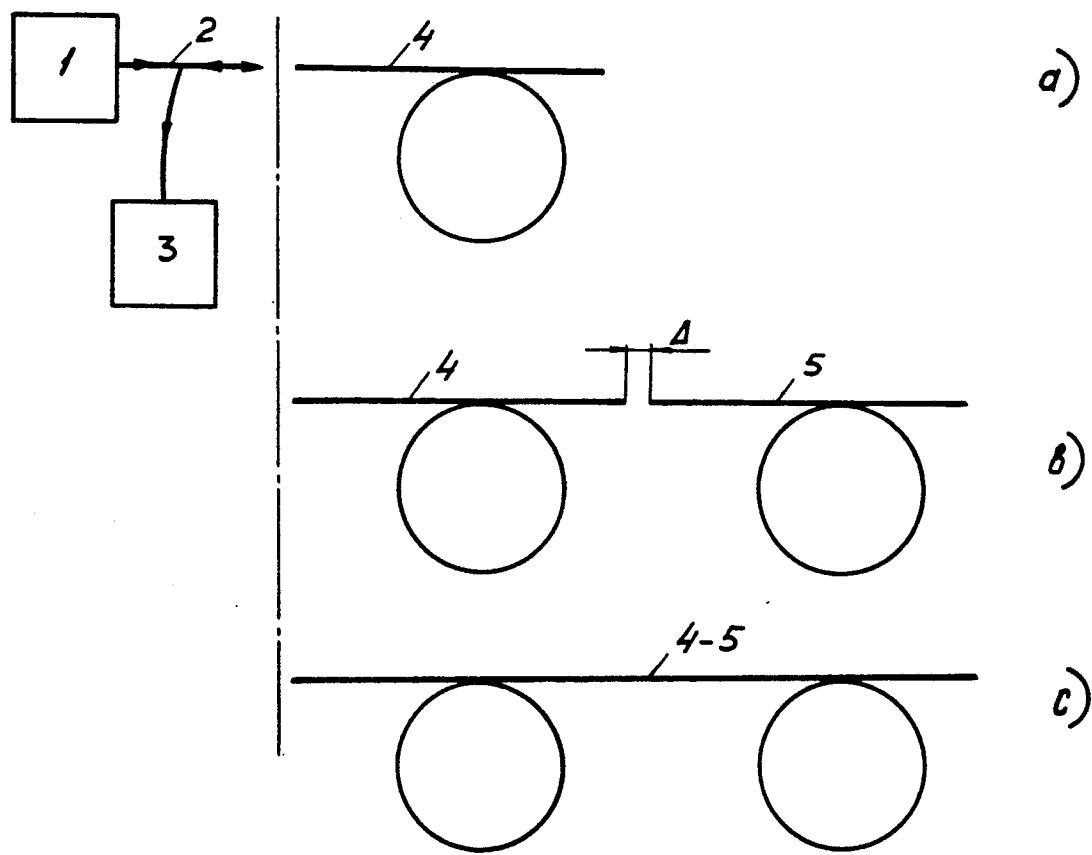
FIGS. 1a–c shows an apparatus for carrying out the method according to the present invention, with two spliced lightguides.

The apparatus comprises a radiation source 1, splitter (branching device) 2 for the incident and reflected radiation, receiver 3 for reflected signals, lightguides 4 spliced so as to form a fiber optics line, the (i−1)th lightguide 5, the i-th lightguide 6, joint area 7 between the (i−1)th and ith lightguides.

DESCRIPTION OF THE PREFERRED EMBODIMENT

The present invention is brought into effect as follows.

In order to provide for better understanding of the engineering essence of the present invention, let us first consider the process of measuring optical transmission losses in the case of two spliced lightguides, FIG. 1.

Having measured the energy or total power $N_1$ of the pulse reflected from the output end face of the idle lightguide 4, and respectively the energy and total power $N_2$ of the pulse reflected from the air gap between the spliced ends of the idle lightguide 4 and the lightguide 5 under investigation, and the energy or, respectively, the total power $N_3$ of the pulse reflected from the output end face of the lightguide 5 under investigation, measured are the total optical transmission losses, $\mu l$, in the latter, proceeding from the equation $$2\ \mu l = 2ln(N_2-N_4) - ln\ N_4 - ln\ N_3 \quad (5)$$

where, l=length of the lightguide under investigation.

Having done that, connect the lightguides 4 and 5 without an air gap. Measure, respectively, the energy or total power $N_4$ of the pulse reflected from the output end face of the thus formed integral lightguide 4-5, equal to $$N_4 = \text{const}\ \phi \exp(-2\ \mu_x l_x) \tau^2 \exp(-2\ \mu l) \rho \quad (6)$$

where, the factor "const" is a characteristic of sensitivity of receiver 3, and transmission factors of the splitter 2 for the forward and reflected radiation;

$\phi$—flux, energy or total power of the radiation pulse from source 1;

$\mu_x, l_x$—total attenuation of radiation within the idle lightguide 4;

$\mu, l$—total attenuation of radiation within the idle lightguide 5 under investigation;

As the signals $N_1$, $N_2$, $N_3$ are equal, respectively, to $$N_1 = \text{const}\phi\exp(-2\mu_x l_x)\rho \quad (7)$$

$$N_2 = \text{const}\phi\exp(-2\mu_x l_x)\rho\left(1 + \frac{1-\rho}{1+\rho}\right) \quad (8)$$

$$N_3 = \text{cosnt}\phi\exp(-2\mu_x l_x)\left(\frac{1-\rho}{1+\rho}\right)^2 \exp(-2\mu l)\rho \quad (9)$$

and the optical transmission losses within the lightguide under investigation are determined by the equation $$\exp(-2\mu l) = \frac{N_3 N_4}{(N_2 - N_4)^2} \quad (10)$$

we can obtain from Equations (6) and (7) the following equation enabling one to identify the losses at the joint as follows $$\tau^2 \exp(-2\mu l) = \frac{N_4}{N_1} \quad (11)$$

Optical transmission losses K at the lightguide joint can be determined from Equations (10) and (11), or direct from Equations (6)-(11) as follows $$K = 1 - \tau = 1 - \frac{N_2 - N_1}{N_1} \sqrt{\frac{N_4}{N_3}} \quad (12)$$

or, expressed in dB $$K = 10 lg \frac{1}{\tau} = 10 lg N_1 + 5 lg N_3 - 10 lg(N_2 - N_1) - 5 lg N_4 \quad (13)$$

or, where the losses $\mu l$ have been determined immediately upon measuring the signal $N_3$, from the equation $$K = 1 - \tau = 1 - \exp(-\mu l) \sqrt{\frac{N_4}{N_1}} \quad (14)$$

or, expressed in dB $$K = 10 lg \frac{1}{\tau} = 10 lg \left[ \exp(\mu l) \sqrt{\frac{N_1}{N_4}} \right] = (-4.343 \mu l)(5 lg N_1 - 5 lg N_4) \quad (15)$$

In the case of splicing together several lightguides, n in number, FIG. 2, the method according to the present invention is carried out as follows.

Figure 2:
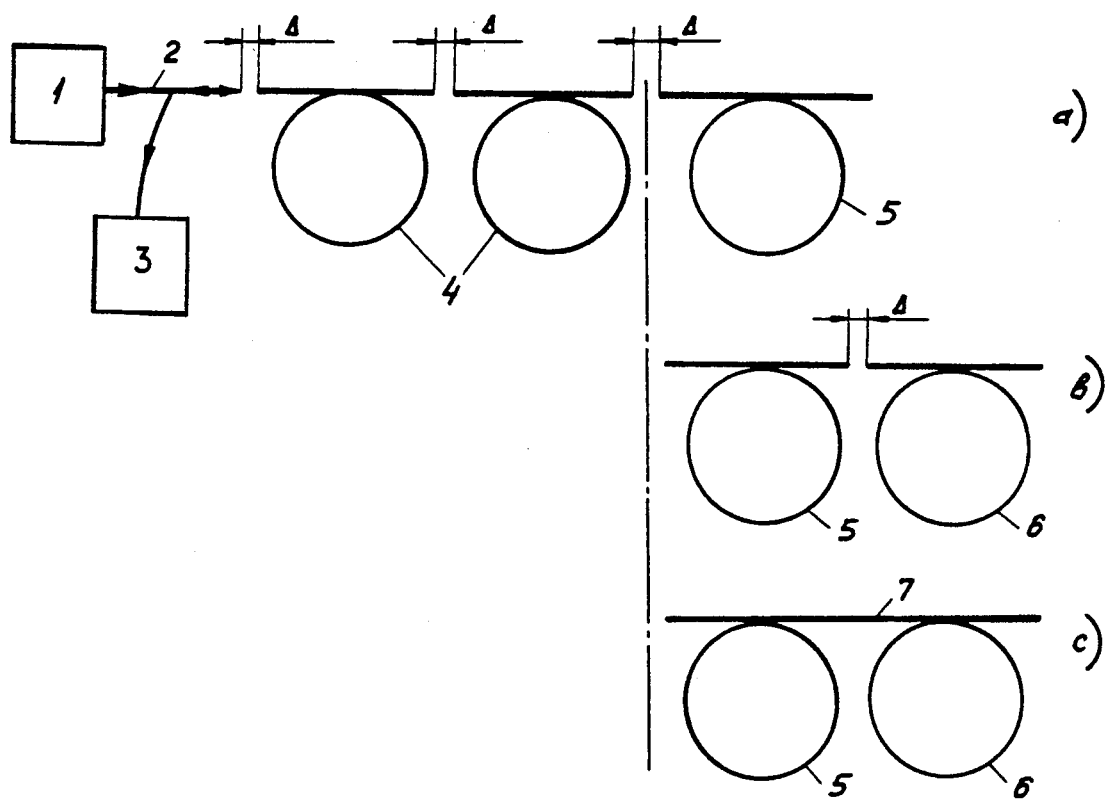
FIGS. 2a–c depicts an apparatus for carrying out the method according to the present invention with n spliced lightguides.

Supply a light pulse from the radiation source 1, having the energy or total power $\phi$, through the splitter 2 into the lightguide 4, measuring signal $N_1$ with the aid of receiver 3, which signal is accounted for by the pulse reflected from the output end face of the (i−1)th lightguide 5 (view a in FIG. 2).

$$N_1 = \mathrm{const} \phi \tau_{1,2} \tau_4 \tau_5 \rho \tau_5 \tau_4 \tau_{2,3} = \mathrm{const} \phi \tau_{1,2} \tau_4^2 \tau_5^2 \rho \quad (16)$$

where $\tau_{1,2}$; $\tau_{2,3}$ are the transmission factors of the splitter for the forward and backward radiation;
$\tau_4$ = transmission factor of the optical line;
$\tau_5$ = transmission factor of the (i−1)th lightguide 5;
$\rho$ = reflection factor of the end face.

Having done that, connect the (i−1)th and ith lightguides so as to accommodate a minimal air gap (view b in FIG. 2). Measure successively the signal accounted for by the total pulse $$N_2 = \mathrm{const} \phi \tau_{1,2} \tau_{2,3} \tau_4^2 \tau_5^2 \rho \left( 1 - \frac{1-\rho}{1+\rho} \right) \quad (17)$$

reflected from the air gap between the lightguides 5 and 6, and the pulse reflected from the output end face of the (i−1)th lightguide 6

$$N_3 = \mathrm{const} \phi \tau_{1,2} \tau_{2,3} \tau_4^2 \tau_5^2 \quad (18)$$

From Equations (16)-(18) one can determine transmission losses $\mu_i l_i$ within the i-th lightguide under investigation $$\exp(-2\mu_i l_i) = \frac{N_1 N_3}{(N_2 - N_4)^2} \quad (19)$$

The next step is to connect lightguides 5 and 6 without an air gap (view c in FIG. 2). Measure the signal $N_4$ accounted for by the pulse reflected from the output end face of the thus formed integral lightguide 5-6

$$N_4 = \mathrm{const} \phi \tau_{1,2} \tau_{2,3} \tau_4^2 \tau_5^2 \tau_i^2 \exp(-2\mu_i l_i) \rho \quad (20)$$

Transmission factor $\tau_i$ for joint 7 of lightguides 5-6 can be found from Equations (16) and (20)

$$\frac{N_4}{N_1} = \tau_i^2 \exp(-2\mu_i l_i) \quad (21)$$

or determined can be optical transmission losses K at the joint between the (i−1)th and ith lightguides $$K_i = 1 - \tau_i = 10 \exp(-\mu_i l_i) \sqrt{\frac{N_4}{N_1}} \quad (22)$$

or, expressed in dB $$K_i = 10 lg \frac{1}{\tau} 10 lg \left[ \exp(-\mu_i l_i) \frac{N_1}{N_4} \right] = (-4.343 \mu_i l_i)(5 lg N_1 - 5 lg N_4) \quad (23)$$

It can be inferred from Equations (16)-(20) that $$K_i = 1 - \tau_i = 1 - \frac{N_2 - N_1}{N_1} \sqrt{\frac{N_4}{N_3}} \quad (24)$$

or, expressed in dB $$K_i = 10 lg \frac{1}{\tau_i} = 10 \, lg N_1 + 5 lg N_4 - 10 lg(N_2 - N_1) - 5 lg N_4 \quad (25)$$

As, in determining optical transmission losses in a light-guide all of the elements of the fiber optics communications line located before the lightguides, are being sounded through by radiation pulses in an invariable steady-state position, the accuracy of measurements of losses, $\mu_i$, in accordance with Equation (19), are determined by the accuracy of measuring of the energy parameters of reflected pulses, $\Delta N$, and by the lightguide length $l_i$.

As $$N \approx \Delta(N_2 - N_4) \approx \Delta N_3 \approx \Delta N_4 N \quad (26)$$

then having differentiated the formula (19), we obtain $$\Delta \mu_i = (2\Delta N/N)(1/l_i) \quad (27)$$

Accordingly, the accuracy in determining radiation losses in the lightguide is determined by the two-fold relative error in measuring the signal $\Delta N/N$.

For $\Delta N/N = \pm 0.1\%$, $\Delta \mu_i l_i = \pm 0.01$ dB, and even for $l_i = 0.1$ km $\Delta \mu_i = \pm 0.01$ dB; for $l = 10$ km $\Delta \mu_i = \pm 0.001$ dB.

The accuracy of measuring losses at the joint between the $(i-1)$th and i-th lightguides is determined, in accordance with Equation (21), by the accuracy of measurement of the signals $N_1$, $N_4$, and by the accuracy of determining the total losses $\mu_i l_i$, as can be inferred from Equation (24)

$$\Delta K/K = \pm \left( \frac{2\Delta N}{N} + \frac{1}{2} \frac{2\Delta N}{N} \right) = \pm \frac{3\Delta N}{N} \quad (28)$$

or $$\Delta K/K \approx \pm \left( \frac{\Delta N}{N} + \Delta \mu_i l_i \right)$$

For the usual magnitude or error $\Delta N/N = 0.1\%$, the error $\Delta K/K = \pm 0.013$ dB $< \pm 0.15$ dB.

For the practical purposes, such accuracy cannot be achieved when making scattered-light measurements with the aid of reflectometers, as only the reproduction of the characteristics of scattering is at a level of $\pm 0.1$–$0.2$ dB.

As compared to the passing-light method of measurements, the method according to the present invention enables one to improve the accuracy of measurements by no less than a factor of two, which is achieved due to the fact that the light flux is passing twice through the lightguide joint.

What is claimed is:

1. Light-reflection method for transmission-loss measurements in optical fiber lightguides, comprising the steps of coupling a sounding light pulse into a first lightguide, measuring the energy $N_1$ of the pulse reflected from the output end face of the first lightguide, splicing the first and second lightguides so as to accommodate a minimal air gap, measuring the energy $N_2$ of the pulse reflected from the air gap positioned between the output and input end faces of the first and second lightguides, respectively, measuring the energy $N_3$ of the pulse reflected from the output end face of the second lightguide, and determining transmission losses in the second lightguide from the equation $$2 \mu l_2 = 2 ln(N_2 - N_4) - ln N_4 - ln N_3 \quad (1)$$

losses of the i-th lightguides out of an arbitrary number of lightguides spliced so as to accommodate minimal air gaps, and at the joint between the $(i-1)$th and ith lightguides (the i-th joint) spliced without an air gap, the signal $N_1$ is measured from the energy or total power of the components of the radiation pulse reflected from the output end face of the $(i-1)$th lightguide, the signal $N_2$ is measured, respectively, from the energy and total power of the components of the pulse reflected from the end faces of the $(i-1)$th and ith lightguides spliced so as to accommodate a minimal air gap, the signal $N_3$ is measured from the energy or total power of the components of the pulse reflected from the output end face of the i-th lightguide, and having determined transmission losses, $\mu_i$, from Equation (1) within the entire i-th lightguide, l in length, the $(i-1)$th and ith lightguides are connected without an air gap, measuring the energy or total power $N_4$ of the components of the pulse reflected from the output end face of the entire lightguide, determining losses K within the i-th joint from the equation $$K_I = 10 \lg \frac{1}{\tau_i} = (-4.34 \, \mu_i l_i)(5 \lg N_1 - 5 \lg N_4) =$$
$$10 \lg N_1 - 10 \lg(N_2 - N_1) + 5 \lg N_3 - 5 \lg N_4$$

where, $\tau_i$ = transmission factor for the i-th joint;
$l_2$ = length of the second lightguide.

2. Light-reflection method for transmission-loss measurements in optical fiber lightguides as claimed in claim 1, further including measuring optical transmission losses at a joint in the lightguide without an air gap, having determined transmission losses $\mu$, in the lightguide under investigation, l in length, by splicing an idle lightguide and the one under investigation together without an air gap, measuring the energy or total power $N_4$ of the pulse reflected from the output end face of the thus formed integral lightguide, measuring optical transmission losses, K, at the joint from the equation $$K = 10 lg \frac{1}{\tau} = (-4.343 \mu l)(5 lg N_1 = 5 lg N_4) =$$
$$= 10 lg N_1 - lg(N_2 - N_1) + 5 lg N_5 - 5 lg N_4$$

* * * * *